June 6, 1939.  C. E. K. MEES  2,161,371
PHOTOGRAPHIC APPARATUS
Filed Feb. 24, 1936
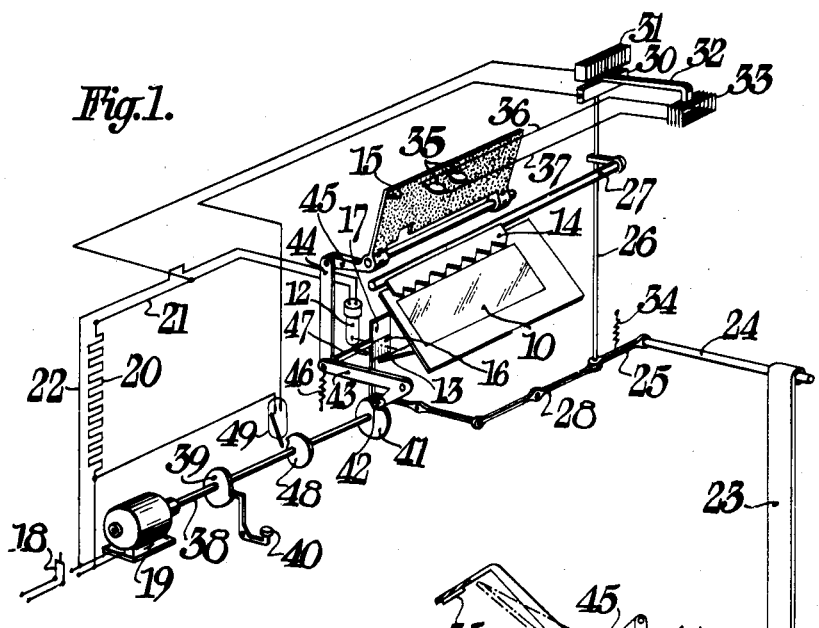
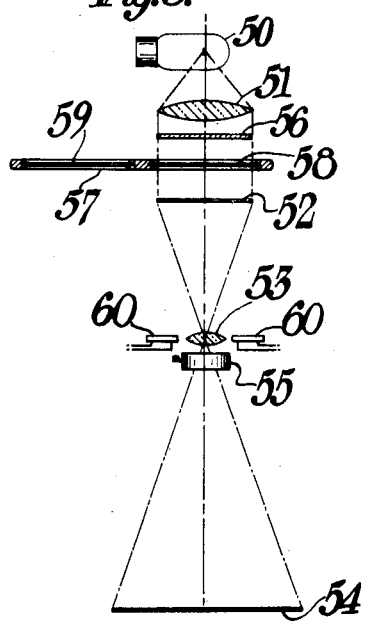
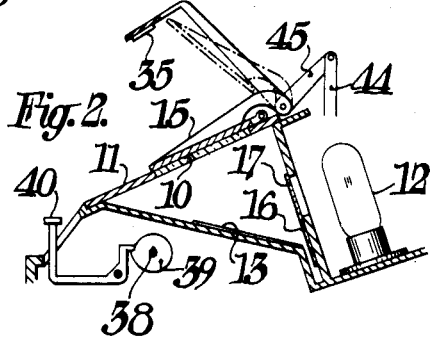
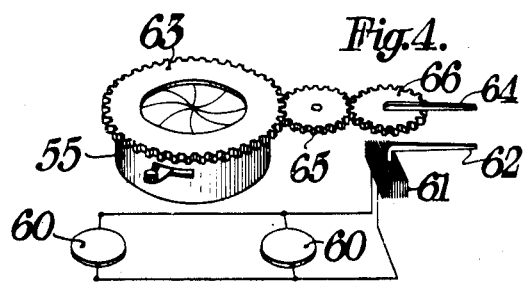
Charles E. K. Mees,
INVENTOR Patented June 6, 1939

2,161,371

UNITED STATES PATENT OFFICE 2,161,371

PHOTOGRAPHIC APPARATUS

Charles E. K. Mees, Rochester, N. Y., assignor, by mesne assignments, to Eastman Kodak Company, Jersey City, N. J., a corporation of New Jersey Application February 24, 1936, Serial No. 65,229

2 Claims. (Cl. 88—24)

My invention relates to photographic apparatus and more particularly to an improved apparatus for photographic printing.

The advantages, objects and details of the apparatus which make up my invention will be clear from the following description when read in connection with the accompanying drawing and from the claims appended hereto.

In making photographic prints from average negatives it is generally necessary or at least desirable to introduce a certain amount of control to obtain the best prints. I have found that improved prints and effective printing control are available if the printing paper is rendered red and infra-red sensitive in addition to its inherent sensitivity to blue. Also, I have found that exceptional advantages may be obtained in printing apparatus designed to employ infra-red sensitive material in conjunction with suitable light sensitive cells which are either specifically sensitive to the spectral region for which the printing material is sensitive, or specifically insensitive to this spectral region.

It is known that contrast in a print is influenced somewhat by the wavelength of the printing light and depends somewhat upon the diffuseness of the printing light, i. e., increasing as the illumination of the record becomes more specular.

My invention provides a process and apparatus for utilizing these properties to a greater extent than has heretofore been possible. The invention itself, as well as the underlying principles, will best be understood from the following description taken in connection with the accompanying drawing, in which:

Fig. 1 illustrates one form my invention may take when applied to a contact printer;

Fig. 2 is a side view in section of the illuminating system used for measuring and printing;

Fig. 3 is a schematic showing of a projection printer for timing an exposure;

Fig. 4 is a view in perspective of a suitable arrangement for timing an exposure.

Only those parts necessary to a complete understanding of the invention have been shown in the drawing, and in Figs. 1 and 2 the invention is shown as applied to a contact printer of the general type disclosed in Patent No. 1,987,036 to Tuttle et al. The usual printing panel 10 mounted in a suitable frame 11 is adapted to be illuminated by light coming from a lamp 12 and reflected by a mirror 13.

The negative or other photographic record is adapted to be held on the panel 10 by a suitable clamp 14 and the printing paper or other material is pressed thereon during printing by a platen 15. Anywhere in the light path between the lamp 12 and the printing plane there is positioned an opaque shutter 16 during the time an exposure is not being made and an infra-red or red and infra-red transmitting filter 17 during an exposure.

A main switch 18 connects a motor 19 to any suitable source of power and energizes the printing lamp 12 to a predetermined intensity through a resistance 20 and leads 21 and 22. When a negative is to be placed on the printing panel 10, a knee lever 23 is pushed to the right as viewed in the drawing to rotate a shaft 24 which shaft acting through an arm 25 and a rod 26 rotates a bar 27 to which is secured the clamp 14, thereby raising this clamp to permit insertion of the negative. The arm 25 also bears upon and depresses one end of a pivoted lever 28, the other end of which is coupled to the opaque shutter 16 through another pivoted lever 29 so that the filter 17 is moved into the light path to the printing panel 10 whenever the knee lever 23 is operated.

An extension of the rod 26 carries at its upper end a movable bar 30 which cooperates with a resistance bar 31 and a pointer 32 to form an adjustable resistance which is adjusted in accordance with the energization of a meter coil 33 to which the pointer 32 is secured as is fully described in Patent No. 1,976,310 to C. M. Tuttle. The bars 30 and 31 normally grip the pointer 32 but release it whenever the knee lever 23 is displaced against the tension of a spring 34. When so released, the pointer 32 is free to be moved by the coil 33.

A plurality of light sensitive elements 35 positioned over the printing panel 10 to receive light transmitted by the panel are connected in multiple through leads 36 and 37 to the meter coil 33. The elements 35 may be of any suitable type which is sensitive to the radiation transmitted by the filter 17 and preferably are cuprous oxide coated barrier type cells.

It is thus evident that knee pressure on the lever 23 inserts the filter 17 in the light path and frees the pointer 32 so that when a negative is placed on the panel 10, the cells 35 will be activated in accordance with the average transmission of the negative and the pointer 32 will be correspondingly moved by the coil 33. Releasing the knee lever 23 causes the bars 30 and 31 to grip the pointer 32 in its new position and the opaque shutter 16 returns to the position shown in Fig. 1. The panel 10 is now dark and the infra-red sensitive paper may be placed thereon and a printing exposure made in a manner now to be described.

The motor 19 rotates continuously and is adapted to be connected to a control shaft 38 for one complete revolution by means of a suitable one-revolution clutch 39 under the control of an operating member 40. The control shaft 38 is provided with a heart-shaped cam 41 which cooperates with a cam follower 42 to lower the platen 15 through a linkage consisting of a bell crank 43 and a link 44 connected to an arm 45 secured to the platen 15. The shape of the cam 41 is such that near the end of its single revolution it permits the platen 15 to be raised by a suitable spring 46. The movement of the bell crank 43 in lowering and raising the platen 15 is utilized to remove the shutter 16 and insert the filter 17 in the light path during the time that the platen 15 is in lowered position by securing the shutter and filter to one end of a pivoted lever 47, the other end of which extends in the path of the bell crank 43. It is of course obvious that other arrangements will operate satisfactorily, and that the filter 17 may be stationary in front of or behind the shutter 16.

The control shaft 38 also carries a cam 48 which is adapted to move a suitable switch 49 to circuit closing position for a part of the single revolution of the shaft 38 as predetermined by the shape of the cam 48. The switch 49 when closed inserts the meter controlled resistance 31 in shunt relation to the lamp circuit resistance 20 and the intensity of the lamp 12 will thus correspond to the value of the resistance 31 as determined by the meter pointer 32.

My invention may even more advantageously be applied to a projection printer and one suitable application is shown in Fig. 3 as comprising a light source 50 and a condenser lens 51 for illuminating a negative 52 to be printed. An objective 53 images the negative 52 on the printing plane 54 and a suitable shutter 55 is provided for timing the exposure.

Between the light source 50 and the printing plane 54 but preferably between the condenser 51 and the negative 52 I insert a thin sheet of flashed opal glass or other suitable light diffusing material 56 and a double filter 57 provided with a minus-red and infra-red filter section 58 and a minus-blue filter section 59. The filter 57 is slidably mounted in any suitable manner (not shown) so that either of the filter sections 58 and 59 may be positioned in the light beam at will. The filter sections 58 and 59 need not be so large if they are mounted near the objective 53.

If automatic or semi-automatic exposure control is desired, light sensitive cells 60 may be provided to measure the average transmission of the negative 52 and govern the exposure in any well known manner. One suitable semi-automatic arrangement is shown in Fig. 4 in which the cells 60 energize a meter coil 61 provided with a pointer 62. The setting ring 63 of the shutter timer 55 is connected to an auxiliary pointer 64 through gears 65 and 66 so that when the pointer 64 is moved to a position indicated by the meter pointer 62 the shutter 55 will be set to give the proper exposure period for printing the negative measured.

The infra-red and blue sensitive paper is positioned in the printing plane 54 and the contrast is controlled by proper choice of wave length. Such control depends upon the well known fact that photographic materials in a specular beam have a higher effective density than they do in diffuse illumination and upon the fact that certain materials such as thin flashed opal glass scatter short wave lengths much more effectively than they do long wave lengths. This scatter of transmitted light is approximately proportional to the inverse square of the wave length and in the arrangement described above the red and infra-red radiation is scattered but little, whereas the shorter wave lengths are almost completely scattered.

It is thus seen that where high contrast is desired the infra-red transmitting filter section 59 is positioned in the light path and the light falling on the printing paper will be nearly specular, while if the blue transmitting filter section 58 is employed the exposing light will be quite diffuse and much lower contrast is obtained.

An additional advantage to be derived from the practise of my invention is the increased effective illumination to be obtained from tungsten lamps due to the fact that the longer wave lengths are being utilized.

It is to be understood that my invention is not restricted to the specific embodiments illustrated, since obvious modifications will suggest themselves without departing from the scope of the invention as set forth in the appended claims.

What I claim as new and desire to secure by Letters Patent of the United States, is:

1. In photographic printing apparatus, means for projecting an image of a photographic record onto a sensitized layer, a source of light for illuminating the record, a light diffusing material between said source and said record, the diffusing power of said material being approximately proportional to the inverse square of the wavelength of the transmitted light, and filter means between said source and said layer for selecting the wavelengths of the printing light, whereby the degree of diffusion may be controlled to a predetermined degree.

2. In photographic apparatus for printing a sensitized layer from a transparent record, a light source, a thin sheet of flashed opal glass between the light source and the record to be printed, and means for selectively restricting the light falling on the sensitized layer to predetermined wavelengths, whereby the degree of diffusion of the light by said opal glass and, hence, the contrast of said record may be controlled.

CHARLES E. K. MEES.